(12) United States Patent
Hecht

(10) Patent No.: US 10,173,271 B2
(45) Date of Patent: Jan. 8, 2019

(54) TOOL SHANK WITH HEAD SUPPORT SURFACE HAVING CENTRAL RECESS PROVIDED WITH RESILIENTLY DISPLACEABLE ABUTMENT PORTIONS

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 0 days.

(21) Appl. No.: 15/672,353

(22) Filed: Aug. 9, 2017

(65) Prior Publication Data

US 2018/0065191 A1 Mar. 8, 2018

Related U.S. Application Data

(60) Provisional application No. 62/384,401, filed on Sep. 7, 2016.

(51) Int. Cl.
*B23B 51/02* (2006.01)

(52) U.S. Cl.
CPC ...... *B23B 51/02* (2013.01); *B23B 2231/0204* (2013.01); *B23B 2251/02* (2013.01); *B23B 2251/40* (2013.01); *B23B 2251/50* (2013.01)

(58) Field of Classification Search
CPC ............. Y10T 408/907; Y10T 408/909; Y10T 408/9093; Y10T 408/9095; Y10T 408/9097; Y10T 408/9098; Y10T 408/90987; Y10T 408/90993; Y10T 408/892; B23B 51/02; B23B 2251/02; B23B 2251/50

See application file for complete search history.

(56) References Cited

U.S. PATENT DOCUMENTS

| 6,109,841 A | 8/2000 | Johne |
| 6,276,879 B1 | 8/2001 | Hecht |

(Continued)

OTHER PUBLICATIONS

International Search Report dated Nov. 8, 2017, issued in PCT counterpart application (No. PCT/IL2017/050875).
Written Opinion dated Nov. 8, 2017, issued in PCT counterpart application (No. PCT/IL2017/050875).

*Primary Examiner* — Nicole N Ramos
(74) *Attorney, Agent, or Firm* — Womble Bond Dickinson (US) LLP

(57) ABSTRACT

A tool shank has a head receiving pocket at a forward end, and a plurality of chip flutes extending rearwardly therefrom along a longitudinal axis. The head receiving pocket has a support surface transverse to the longitudinal axis. A central recess is formed in the support surface and extends rearwardly therefrom. The central recess has a plurality of resiliently displaceable abutment portions circumferentially alternating with and spaced apart by a plurality of intermediate portions. Each abutment portion has a radially inward facing abutment surface, and each intermediate portion has an intermediate surface intersecting two circumferentially adjacent abutment surfaces. A rotary cutting tool includes the shank and a cutting head releasably mounted thereto. The cutting head has a mounting portion provided with a base surface and an engagement member protruding therefrom. In an assembled position, the engagement member is resiliently retained in the central recess against the plurality of abutment surfaces.

28 Claims, 5 Drawing Sheets

(56) References Cited

U.S. PATENT DOCUMENTS

| | | | |
|---|---|---|---|
| 7,189,039 B2* | 3/2007 | Pantzar | B23B 29/046 279/8 |
| 7,309,196 B2 | 12/2007 | De Souza | |
| 7,360,974 B2 | 4/2008 | Borschert et al. | |
| 7,377,730 B2 | 5/2008 | Hecht et al. | |
| 7,467,915 B2 | 12/2008 | De Souza | |
| 7,972,094 B2 | 7/2011 | Men et al. | |
| 8,021,088 B2 | 9/2011 | Hecht | |
| 8,534,966 B2 | 9/2013 | Hecht | |
| 8,556,552 B2 | 10/2013 | Hecht | |
| 8,992,141 B2 | 3/2015 | Hecht et al. | |
| 8,992,142 B2 | 3/2015 | Hecht | |
| 9,028,180 B2 | 5/2015 | Hecht | |
| 2008/0025806 A1* | 1/2008 | de Souza | B23B 51/00 408/230 |
| 2008/0193238 A1 | 8/2008 | Hecht | |
| 2009/0116920 A1* | 5/2009 | Bae | B23B 51/02 408/227 |
| 2010/0322723 A1* | 12/2010 | Danielsson | B23B 51/02 407/114 |
| 2012/0099938 A1 | 4/2012 | Shitrit et al. | |
| 2012/0121347 A1* | 5/2012 | Osawa | B23B 51/02 408/57 |
| 2012/0155978 A1* | 6/2012 | Osawa | B23B 51/02 408/200 |
| 2012/0315101 A1* | 12/2012 | Osawa | B23B 51/02 408/226 |
| 2014/0017022 A1* | 1/2014 | Schwaegerl | B23B 51/00 408/231 |
| 2015/0360300 A1 | 12/2015 | Hecht | |

\* cited by examiner

TOOL SHANK WITH HEAD SUPPORT SURFACE HAVING CENTRAL RECESS PROVIDED WITH RESILIENTLY DISPLACEABLE ABUTMENT PORTIONS

RELATED APPLICATIONS

The present application claims priority to U.S. Provisional application No. 62/384,401 of Sep. 7, 2016. The contents of the aforementioned application are incorporated by reference in their entirety.

FIELD OF THE INVENTION

The present invention relates to a rotary cutting tool and a tool shank having a head receiving pocket with resiliently displaceable abutment portions, for use in metal cutting processes in general, and for drilling operations in particular.

BACKGROUND OF THE INVENTION

Within the field of cutting tools used in drilling operations, there are many examples of tool shanks having head receiving pockets with 'circumferentially open' central recesses and resiliently displaceable abutment portions.

U.S. Pat. No. 7,360,974 discloses a rotary cutting tool having a tool shank and a replaceable cutting insert. The tool shank includes two longitudinally extending chip flutes and a location opening at the tip of the shank which is open to the chip flutes. The location opening has a circular cross-section. The cutting insert includes a fastening pin having a slightly elliptical cross-section which is inserted into the location opening and rotated into a braced position.

U.S. Pat. No. 7,467,915 discloses a rotary cutting tool having a tool shank and a replaceable cutting head which is installed on and engages a head receiving pocket of the tool shank. The cutting head has a shank connection portion with a dovetail member. The head receiving pocket includes two generally symmetrical castellated wall sections projecting upwardly from a central floor portion. The castellated wall sections include internally facing frustoconical surfaces, and when the dovetail member is rotated into an interlocked position with respect to the head receiving pocket, the dovetail member engages the internally facing frustoconical surfaces.

It is an object of the present invention to provide an improved tool shank having a head receiving pocket with a 'circumferentially confined' central recess and resiliently displaceable abutment portions.

It is also an object of the present invention to provide an improved rotary cutting tool in which a cutting head is releasably mounted to the head receiving pocket of the tool shank with a high level of repeatability.

SUMMARY OF THE INVENTION

In accordance with the present invention, there is provided a tool shank having a longitudinal axis of rotation establishing a forward-to-rearward direction and comprising:

a head receiving pocket at a forward end, and a plurality of chip flutes extending in the rearward direction therefrom along the longitudinal axis of rotation, the head receiving pocket having a support surface transverse to the longitudinal axis of rotation, and a central recess, wherein:

the central recess is formed in the support surface and extends in the rearward direction therefrom, along the longitudinal axis of rotation, the central recess has a plurality of resiliently displaceable abutment portions circumferentially alternating with and spaced apart by a plurality of intermediate portions, each abutment portion has a radially inward facing abutment surface, and each intermediate portion has an intermediate surface intersecting two circumferentially adjacent abutment surfaces.

Also in accordance with the present invention, there is provided a rotary cutting tool comprising a tool shank of the sort described above, and a cutting head releasably mounted in the head receiving pocket thereof, the cutting head comprising:
a cutting portion and a mounting portion,
the mounting portion having a base surface and an engagement member protruding therefrom along a head axis, wherein in an assembled position:
the base surface faces the support surface,
the head axis is coincident with the longitudinal axis of rotation, and
the engagement member is resiliently retained in the central recess against the plurality of abutment surfaces.

Further in accordance with the present invention, there is provided a method of the assembling a rotary cutting tool of the sort described above, in which the engagement member has a plurality of radially outward facing engagement surfaces circumferentially alternating with a plurality of joining surfaces, comprising the steps of:

a) orienting the base surface to face the support surface;
b) aligning the head axis with the longitudinal axis of rotation;
c) rotationally aligning the plurality of engagement surfaces with the plurality of intermediate surfaces;
d) inserting the engagement member into the central recess; and
e) rotating the cutting head about its head axis until the plurality of engagement surfaces are resiliently retained against the plurality of abutment surfaces.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
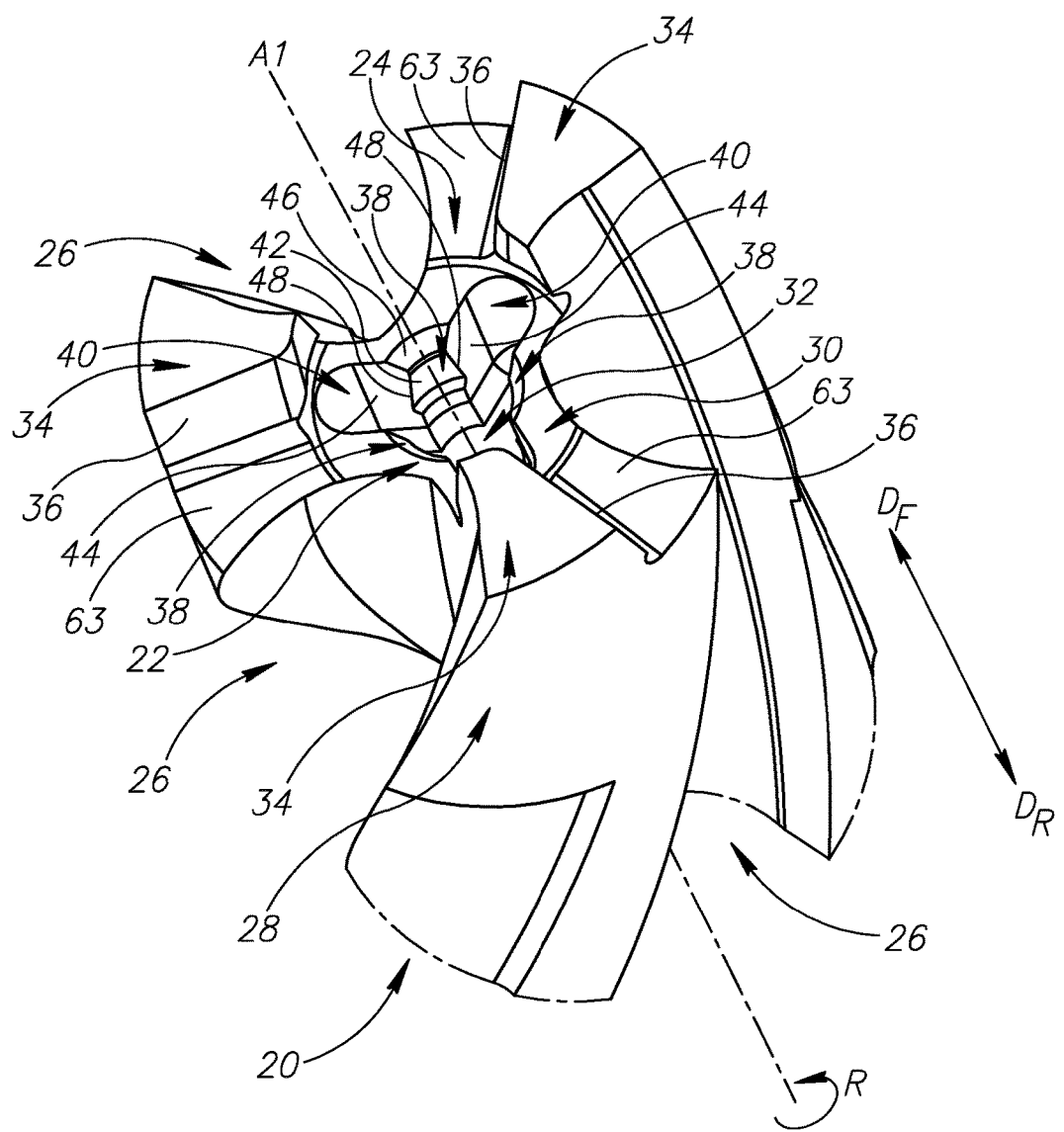
FIG. 1 is a perspective view of a tool shank in accordance with some embodiments of the present invention.
Figure 2:
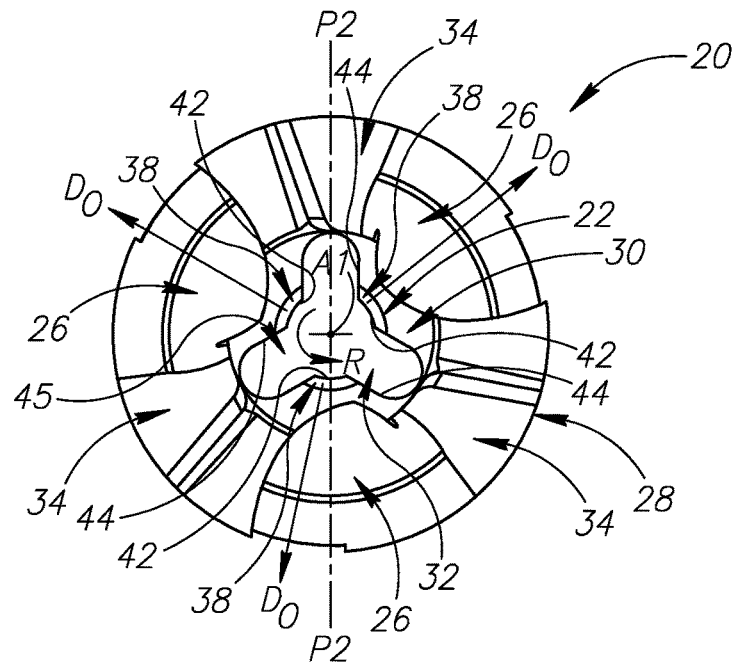
FIG. 2 is an end view of the tool shank shown in FIG. 1.
Figure 3:
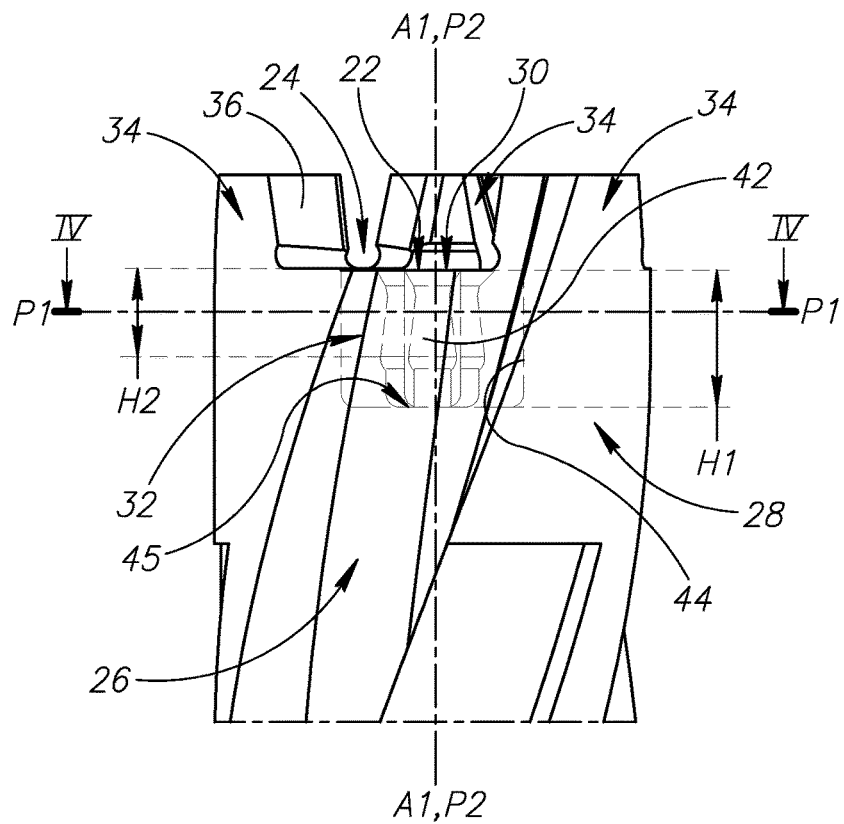
FIG. 3 is a side view of the tool shank shown in FIG. 1.

The present invention relates to a tool shank 20 having a longitudinal axis of rotation A1 establishing a forward direction $D_F$ to rearward direction $D_R$. As shown in FIGS. 1 to 3, the tool shank 20 has a head receiving pocket 22 at a forward end 24, and a plurality of chip flutes 26 extending in the rearward direction $D_R$ therefrom along the longitudinal axis of rotation A1.

In some embodiments of the present invention, the plurality of chip flutes 26 may be formed in a cylindrical shank peripheral surface 28 of the tool shank 20.

Also in some embodiments of the present invention, the plurality of chip flutes 26 may helically extend along the longitudinal axis of rotation A1.

Further in some embodiments of the present invention, the tool shank 20 may have three chip flutes 26.

Yet further in some embodiments of the present invention, the tool shank 20 may preferably be manufactured from tool steel.

According to the present invention, as shown in FIGS. 1 to 3, the head receiving pocket 22 has a support surface 30 transverse to the longitudinal axis of rotation A1.

A central recess 32 is formed in the support surface 30 and extends in the rearward direction $D_R$ therefrom, along the longitudinal axis of rotation A1.

As shown in the end view of FIG. 2, the support surface 30 may be radially spaced apart from the shank peripheral surface 28 of the tool shank 20 and located in a central area of the pocket 22, and thus may be considered to be a "central" support surface 30.

In some embodiments of the present invention, the central recess 32 may not intersect any of the plurality of chip flutes 26.

Also in some embodiments of the present invention, the head receiving pocket 22 may be devoid of a passage communicating the central recess 32 with any of the plurality of chip flutes 26.

Further in some embodiments of the present invention, the support surface 30 may be planar and perpendicular to the longitudinal axis of rotation A1.

Yet further in some embodiments of the present invention, a plurality of drive members 34 may protrude forwardly from the support surface 30, and each drive member 34 may include a drive surface 36 facing in a rotation direction R about the longitudinal axis of rotation A1.

Figure 4:
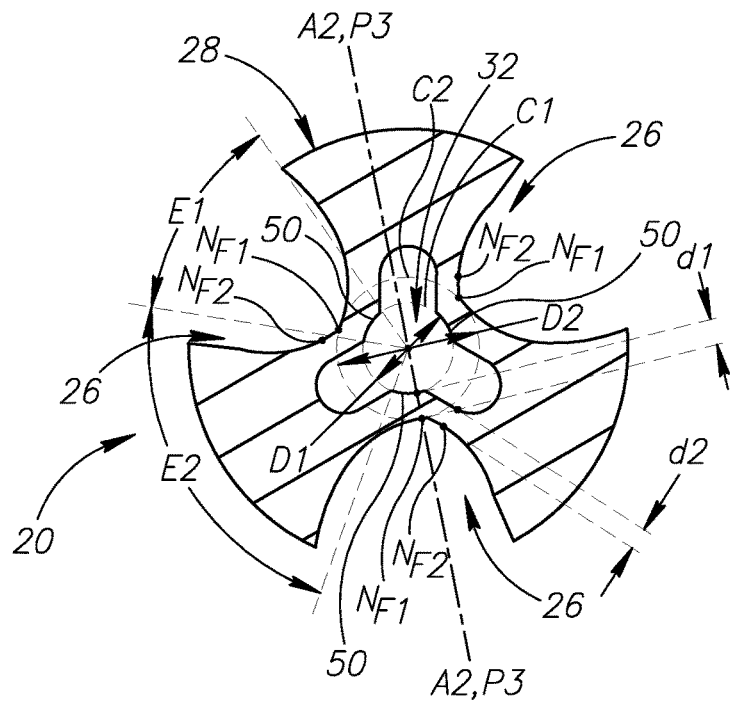
FIG. 4 is a cross-sectional view of the tool shank shown in FIG. 3, taken along the line IV-IV.

As shown in FIG. 4, in a cross-section taken in a first plane P1 perpendicular to the longitudinal axis of rotation A1 and passing through the central recess 32, the central recess 32 may be non-circular, and therefore may have a non-circular cross-section.

In some embodiments of the present invention, the central recess 32 may exhibit rotational symmetry about the longitudinal axis of rotation A1.

Also in some embodiments of the present invention, as shown in FIG. 2, the central recess 32 may exhibit mirror symmetry about a second plane P2 containing the longitudinal axis of rotation A1.

According to the present invention, as shown in FIGS. 1 and 2, the central recess 32 has a plurality of resiliently displaceable abutment portions 38 circumferentially alternating with and spaced apart by a plurality of intermediate portions 40.

In some embodiments of the present invention, the plurality of abutment portions 38 may be resiliently displaceable in a radially outward direction $D_O$.

Also in some embodiments of the present invention, the plurality of abutment portions 38 may be equal in number to the plurality of intermediate portions 40.

Further in some embodiments of the present invention, the plurality of abutment portions 38 may be equal in number to the plurality of chip flutes 26.

According to the present invention, as shown in FIG. 2, each abutment portion 38 has a radially inward facing abutment surface 42, and each intermediate portion 40 has an intermediate surface 44 intersecting two circumferentially adjacent abutment surfaces 42. Each intermediate surface 44 extends radially outward of the two adjacent abutment surfaces 42.

By virtue of the plurality of abutment surfaces 42 circumferentially alternating with the plurality of intermediate surfaces 44, the head receiving pocket 22 has a 'circumferentially confined' central recess 32, which improves the resilience of the plurality of abutment portions 38 and extends the useful life of the tool shank 20.

In some embodiments of the present invention, the plurality of intermediate surfaces 44 may extend along the entire longitudinal extent of the plurality of abutment surfaces 42.

As shown in the hidden detail of FIG. 3, the plurality of intermediate surfaces 44 may extend to a first recess depth H1 rearward of the support surface 30 to a central recess floor 45, and the plurality of abutment surfaces 42 may extend to a second recess depth H2 rearward of the support surface 30 and be longitudinally spaced apart from the central recess floor 45.

In some embodiments of the present invention, a ratio of the first recess depth H1 to the second recess depth H2 may have a range of between 1.3 and 2.5 (1.3<H1/H2<2.5). This provides the plurality of abutment portions 38 with an optimum level of resilience in the region of the abutment surfaces 42.

Also in some embodiments of the present invention, the plurality of intermediate surfaces 44 may intersect the support surface 30.

Further in some embodiments of the present invention, each abutment portion 38 may include an abutment chamfer 46 between its abutment surface 42 and the support surface 30.

Yet further in some embodiments of the present invention, the plurality of abutment surfaces 42 may diverge in the rearward direction $D_R$.

Yet still further in some embodiments of the present invention, two transition edges 48 may be formed at the intersection of each intermediate surface 44 and its two circumferentially adjacent abutment surfaces 42.

As shown in FIG. 3, in some embodiments, in a tool shank side view tangential to the support surface 30, the entire central recess 32 (whose outline is indicated by the broken lines) may be hidden from view, with no portion of the abutment surfaces 42 and the intermediate surfaces 44 being visible. Thus, the central recess 32 can be considered to be a "sunken" central recess 32 which is formed in the support surface 30.

As shown in FIG. 4, in the cross-section taken in the first plane P1, each abutment surface 42 has a first circumferential angular extent E1 and each intermediate surface 44 has a second circumferential angular extent E2.

In some embodiments of the present invention, the combined circumferential angular extent of the plurality of abutment surfaces 42 and the plurality of intermediate surfaces 44 may be equal to 360°.

Also in some embodiments of the present invention, the second circumferential angular extent E2 may be greater than the first circumferential angular extent E1.

As shown in FIG. 4, in the cross-section taken in the first plane P1, an imaginary first circle C1 coaxial with the longitudinal axis of rotation A1 inscribes the central recess 32.

In some embodiments of the present invention, the imaginary first circle C1 may contact the plurality of abutment surfaces 42.

Also in some embodiments of the present invention, the plurality of intermediate surfaces 44 may be located outside the imaginary first circle C1.

Further in some embodiments of the present invention, the plurality of abutment surfaces 42 may form a plurality of spaced apart abutment arcs 50 coincident with the imaginary first circle C1.

As shown in FIG. 4, in the cross-section taken in the first plane P1, an imaginary second circle C2 coaxial with the longitudinal axis of rotation A1 is tangent to the plurality of chip flutes 26 at a plurality of first flute points $N_F1$.

In some embodiments of the present invention, a third plane P3 containing the longitudinal axis of rotation A1 and at least one of the first flute points $N_F1$ may intersect at least one of the abutment surfaces 42.

Also in some embodiments of the present invention, the imaginary first circle C1 has a first diameter D1, the imaginary second circle C2 has a second diameter D2, and first diameter D1 may be greater than half the second diameter D2.

It should be appreciated that the first diameter D1 of the imaginary first circle C1 is measured in the absence of radially outward forces $F_O$ being applied to the plurality of abutment surfaces 42.

Figure 5:
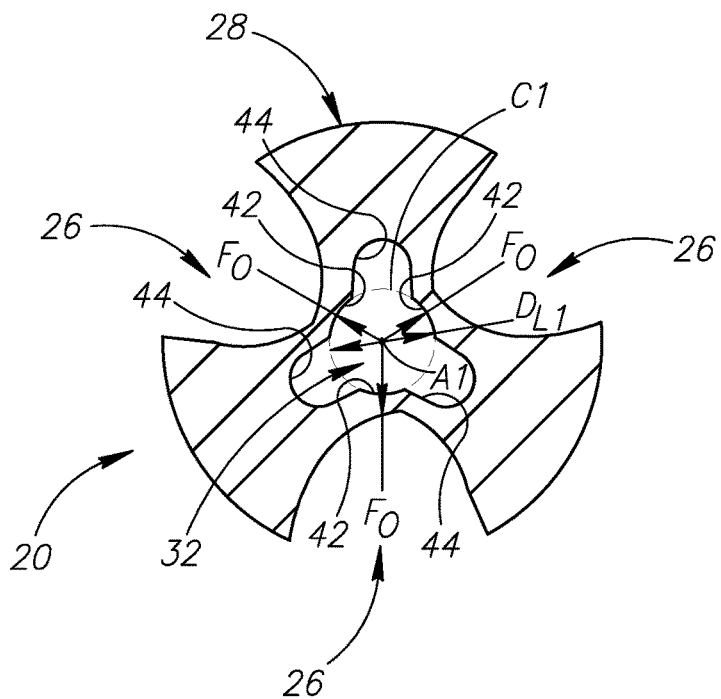
FIG. 5 is the cross-sectional view shown in FIG. 4, in the presence of radially outward forces.

As shown in FIG. 5, in the presence of radially outward forces $F_O$ being applied to the plurality of abutment surfaces 42, the imaginary first circle C1 has a first loaded diameter $D_L1$.

In some embodiments of the present invention, the first diameter D1 may be less than the first loaded diameter $D_L1$.

As shown in FIG. 4, a radial axis A2 is formed at the intersection of the first and third planes P1, P3.

In some embodiments of the present invention, each first flute point $N_F1$ may be located a minimum first distance d1 from its adjacent abutment surface 42 along the radial axis A2.

As shown in FIG. 4, in the cross-section taken in the first plane P1, each chip flute 26 has a second flute point $N_F2$ spaced apart from the first flute point $N_F1$, and the second flute point $N_F2$ is located a minimum second distance d2 from its adjacent intermediate surface 44.

In some embodiments of the present invention, the minimum second distance d2 may be equal to or less than the minimum first distance d1.

Figure 6:
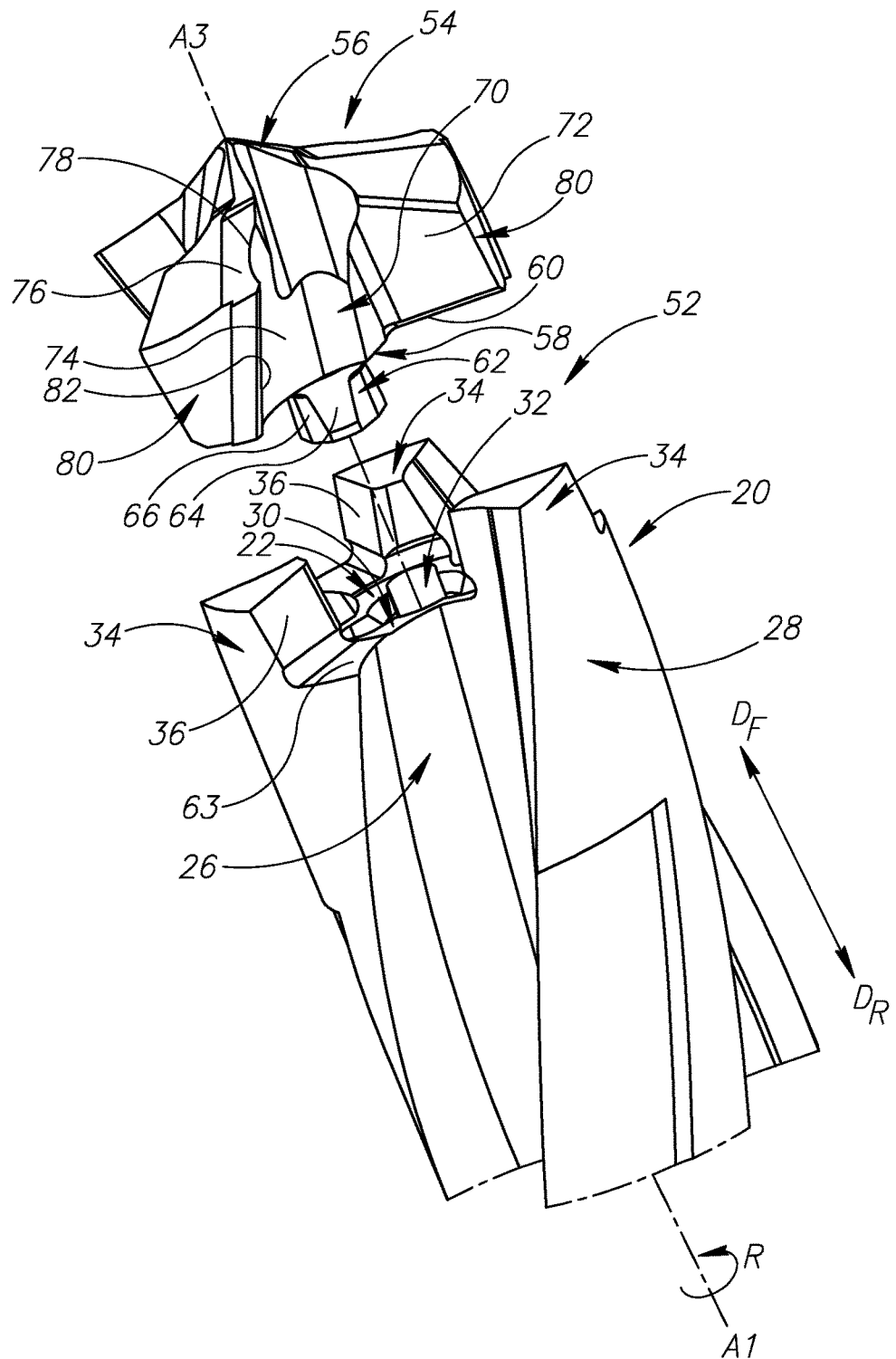
FIG. 6 is an exploded perspective view of a rotary cutting tool in accordance with some embodiments of the present invention.
Figure 7:
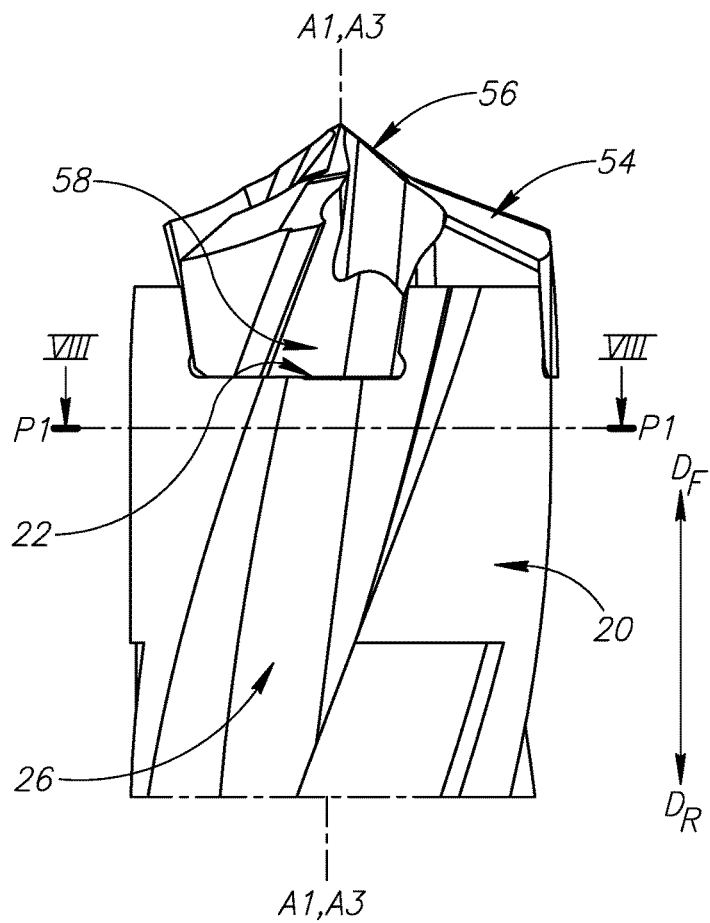
FIG. 7 is a side view of the rotary cutting tool shown in FIG. 6.

As shown in FIGS. 6 and 7, the present invention further relates to a rotary cutting tool 52 comprising the tool shank 20 and a cutting head 54 releasably mounted in the head receiving pocket 22 of the tool shank 20.

In some embodiments of the present invention, the cutting head 54 may preferably be manufactured by form pressing and sintering a cemented carbide, such as tungsten carbide, and may be coated or uncoated.

Also in some embodiments, the cutting head 54 may be releasably mounted in the head receiving pocket 22 without the requirement of an additional fastening member, such as a clamping screw.

According to the present invention, the cutting head 54 has a cutting portion 56 and a mounting portion 58, and the mounting portion 58 has a base surface 60 and an engagement member 62 protruding therefrom along a head axis A3.

In an assembled position:
the base surface 60 faces the support surface 30,
the head axis A3 is coincident with the longitudinal axis of rotation A1, and
the engagement member 62 is resiliently retained in the central recess 32 against the plurality of abutment surfaces 42.

In some embodiments of the present invention, the engagement member 62 may be located distal from the cutting portion 56.

Figure 8:
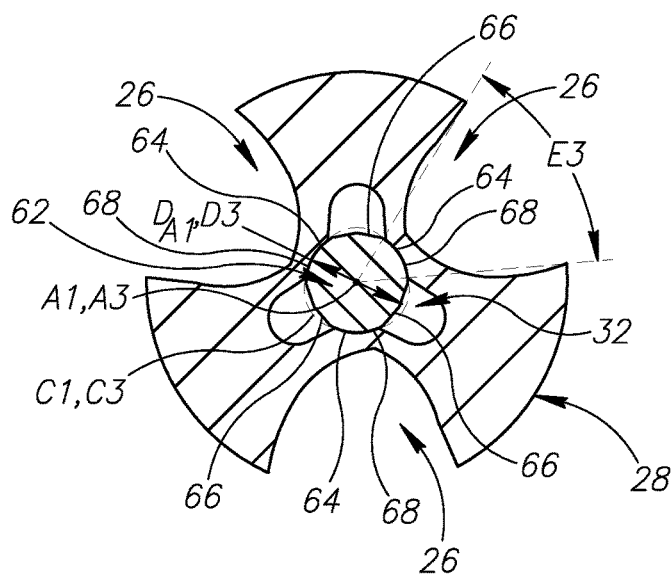
FIG. 8 is a cross-sectional view of the rotary cutting tool shown in FIG. 7, taken along the line VIII-VIII.

As shown in FIG. 8, in the cross-section taken in the first plane P1, the engagement member 62 may be non-circular.

In some embodiments of the present invention, the base surface 60 may make contact with the support surface 30, or a plurality of shoulder surfaces 63 offset therefrom.

It should be appreciated that the first diameter D1 of the imaginary first circle C1 is measured in a non-assembled position, in which the engagement member 62 is not resiliently retained in the central recess 32.

In the assembled position, as shown in FIG. 8, the imaginary first circle C1 has a first assembly diameter $D_A1$.

In some embodiments of the present invention, the first diameter D1 may be less than the first assembly diameter $D_A1$.

As shown in FIG. 6, the engagement member 62 may have a plurality of radially outward facing engagement surfaces 64 circumferentially alternating with a plurality of joining surfaces 66.

In some embodiments of the present invention, in the assembled position, the plurality of engagement surfaces 64 may make contact with the plurality of abutment surfaces 42 belonging to the central recess 32.

Also in some embodiments of the present invention, the plurality of engagement surfaces 64 may diverge in the rearward direction $D_R$, and the engagement member 62 may have a dovetail shape.

As shown in FIG. 8, in the cross-section taken in the first plane P1, each engagement surface 64 has a third circumferential angular extent E3.

In some embodiments of the present invention, the second circumferential angular extent E2 may be greater than the third circumferential angular extent E3.

During assembly of the rotary cutting tool 52, by virtue of the second circumferential angular extent E2 being greater than the third circumferential angular extent E3, the plurality of engagement surfaces 64 can be rotationally aligned with the plurality of intermediate surfaces 44 and the engagement member 62 can be easily inserted into the central recess 32.

As shown in FIG. 8, in the cross-section taken in the first plane P1, an imaginary third circle C3 coaxial with the longitudinal axis of rotation A1 circumscribes the engagement member 62.

In some embodiments of the present invention, the imaginary third circle C3 may contact the plurality of engagement surfaces 64.

Also in some embodiments of the present invention, the plurality of joining surfaces 66 may be located inside the imaginary third circle C3.

Further in some embodiments of the present invention, the plurality of engagement surfaces 64 may form a plurality of spaced apart engagement arcs 68 coincident with the imaginary third circle C3.

Yet further in some embodiments of the present invention, the imaginary third circle C3 may have a third diameter D3 equal to the first assembly diameter $D_A1$.

As shown in FIGS. 6 and 7, the mounting portion 58 may have a plurality of circumferentially spaced apart side surfaces 70 extending away from the base surface 60 towards the cutting portion 56, with each side surface 70 including a torque transmission surface 72.

In some embodiments of the present invention, each drive surface 36 may make contact with one of the torque transmission surfaces 72.

Also in some embodiments of the present invention, each side surface 70 may include a flute extension surface 74, and each flute extension surface 74 may intersect a leading surface 76 of the cutting portion 56 to form a cutting edge 78.

Further in some embodiments of the present invention, a plurality of head peripheral surfaces 80 may circumferentially alternate with the plurality of side surfaces 70, and each flute extension surface 74 may intersect one of the head peripheral surfaces 80 to form a leading edge 82.

The present invention further relates to a method of assembling the rotary cutting tool 52, comprising the steps of:
 a) orienting the base surface 60 to face the support surface 30;
 b) aligning the head axis A3 with the longitudinal axis of rotation A1;
 c) rotationally aligning the plurality of engagement surfaces 64 with the plurality of intermediate surfaces 44;
 d) inserting the engagement member 62 into the central recess 32; and
 e) rotating the cutting head 54 about its head axis A3 until the plurality of engagement surfaces 64 are resiliently retained against the plurality of abutment surfaces 42.

In some embodiments of the present invention, in step d), the engagement member 62 may be inserted into the central recess 32 until the base surface 60 makes contact with the support surface 30, or the plurality of shoulder surfaces 63.

Also in some embodiments of the present invention, in step e), the cutting head 54 may be rotated about its head axis A3 in a direction opposite to the rotation direction R until each drive surface 36 makes contact with one of the torque transmission surfaces 72.

Although the present invention has been described to a certain degree of particularity, it should be understood that various alterations and modifications could be made without departing from the spirit or scope of the invention as hereinafter claimed.

What is claimed is:

1. A tool shank (20) having a longitudinal axis of rotation (A1) establishing a forward-to-rearward direction ($D_F$, $D_R$) and comprising:
 a head receiving pocket (22) at a forward end (24), and a plurality of chip flutes (26) extending in the rearward direction (DR) therefrom along the longitudinal axis of rotation (A1),
 the head receiving pocket (22) having a support surface (30) transverse to the longitudinal axis of rotation (A1), and a central recess (32),
 wherein:
 the central recess (32) is circumferentially confined and formed in the support surface (30) and extends in the rearward direction (DR) therefrom, along the longitudinal axis of rotation (A1),
 the central recess (32) has a plurality of resiliently displaceable abutment portions (38) circumferentially alternating with and spaced apart by a plurality of intermediate portions (40),
 each abutment portion (38) has a radially inward facing abutment surface (42), and
 each intermediate portion (40) has an intermediate surface (44) intersecting two circumferentially adjacent abutment surfaces (42).

2. The tool shank (20) according to claim 1, wherein in a cross-section taken in a first plane (P1) perpendicular to the longitudinal axis of rotation (A1) and passing through the central recess (32):
 each abutment surface (42) has a first circumferential angular extent (E1),
 each intermediate surface (44) has a second circumferential angular extent (E2), and
 the combined circumferential angular extent of the plurality of abutment surfaces (42) and the plurality of intermediate surfaces (44) is equal to 360°.

3. The tool shank (20) according to claim 2, wherein:
 the second circumferential angular extent (E2) is greater than the first circumferential angular extent (E1).

4. The tool shank (20) according to claim 1, wherein:
 in a cross-section taken in a first plane (P1) perpendicular to the longitudinal axis of rotation (A1) and passing through the central recess (32):
 an imaginary first circle (C1) coaxial with the longitudinal axis of rotation (A1) inscribes the central recess (32).

5. The tool shank (20) according to claim 4, wherein:
 in the absence of radially outward forces (FO) being applied to the plurality of abutment surfaces (42), the imaginary first circle (C1) has a first diameter (D1),
 in the presence of radially outward forces (FO) being applied to the plurality of abutment surfaces (42), the imaginary first circle (C1) has a first loaded diameter (DL1), and
 the first diameter (D1) is less than the first loaded diameter (DL1).

6. The tool shank (20) according to claim 4, wherein in the cross-section taken in the first plane (P1):
 an imaginary second circle (C2) coaxial with the longitudinal axis of rotation (A1) is tangent to the plurality of chip flutes (26) at a plurality of first flute points (NF1), and
 a third plane (P3) containing the longitudinal axis of rotation (A1) and at least one of the first flute points (NF1) intersects at least one of the abutment surfaces (42).

7. The tool shank (20) according to claim 6, wherein:
 the imaginary first circle (C1) has a first diameter (D1),
 the imaginary second circle (C2) has a second diameter (D2), and
 first diameter (D1) is greater than half the second diameter (D2).

8. The tool shank (20) according to claim 6, wherein:
 a radial axis (A2) is formed at the intersection of the first and third planes (P1, P3), and each first flute point (NF1) is located a minimum first distance (d1) from its adjacent abutment surface (42) along the radial axis (A2).

9. The tool shank (22) according to claim 8, wherein in the cross-section taken in the first plane (P1):
each chip flute (26) has a second flute point (NF2) spaced apart from the first flute point (NF1),
the second flute point (NF2) is located a minimum second distance (d2) from its adjacent intermediate surface (44), and
the minimum second distance (d2) is equal to or less than the minimum first distance (d1).

10. The tool shank (20) according to claim 4, wherein:
the imaginary first circle (C1) contacts the plurality of abutment surfaces (42).

11. The tool shank (20) according to claim 1, wherein:
the plurality of intermediate surfaces (44) extend to a first recess depth (H1) rearward of the support surface (30) to a central recess floor (45);
the plurality of abutment surfaces (42) extend to a second recess depth (H2) rearward of the support surface (30) and are longitudinally spaced apart from the central recess floor (45); and
a ratio of the first recess depth (H1) to the second recess depth (H2) is between 1.3 and 2.5 (1.3<H1/H2<2.5).

12. The tool shank (20) according to claim 1, wherein:
in a cross-section taken in a first plane (P1) perpendicular to the longitudinal axis of rotation (A1) and passing through the central recess (32), the central recess (32) does not intersect any of the plurality of chip flutes (26).

13. The tool shank (20) according to claim 1, wherein:
the plurality of abutment surfaces (42) diverge from one another in the rearward direction (DR).

14. The tool shank (20) according to claim 1, wherein:
the plurality of intermediate surfaces (44) intersect the support surface (30).

15. The tool shank (20) according to claim 1, wherein:
the plurality of abutment portions (38) are resiliently displaceable in a radially outward direction (DO).

16. The tool shank (20) according to claim 1, wherein:
in a tool shank side view tangential to the support surface (30), the entire central recess (32) is hidden from view, with no portion of the abutment surfaces (42) and the intermediate surfaces (44) being visible.

17. A rotary cutting tool (52) comprising the tool shank (20) in accordance with claim 1, and a cutting head (54) releasably mounted in the head receiving pocket (22), the cutting head (54) comprising:
a cutting portion (56) and a mounting portion (58),
the mounting portion (58) having a base surface (60) and an engagement member (62) protruding therefrom along a head axis (A3),
wherein in an assembled position:
the base surface (60) faces the support surface (30),
the head axis (A3) is coincident with the longitudinal axis of rotation (A1), and
the engagement member (62) is resiliently retained in the central recess (32) against the plurality of abutment surfaces (42).

18. The rotary cutting tool (52) according to claim 17, wherein
in a cross-section taken in a first plane (P1) perpendicular to the longitudinal axis of rotation (A1) and passing through the central recess (32):
an imaginary first circle (C1) coaxial with the longitudinal axis of rotation (A1) inscribes the central recess (32), and
wherein:
in a non-assembled position, in which the engagement member (62) is not resiliently retained in the central recess (32), the imaginary first circle (C1) has a first diameter (D1),
in the assembled position, the imaginary first circle (C1) has a first assembly diameter (DA1), and
the first diameter (D1) is less than the first assembly diameter (DA1).

19. The rotary cutting tool (52) according to claim 18, wherein:
the imaginary first circle (C1) contacts the plurality of abutment surfaces (42).

20. The rotary cutting tool (52) according to claim 17, wherein:
the engagement member (62) has a plurality of radially outward facing engagement surfaces (64) circumferentially alternating with a plurality of joining surfaces (66), and
the plurality of engagement surfaces (64) make contact with the plurality of abutment surfaces (42).

21. The rotary cutting tool (52) according to claim 20, wherein:
in a cross-section taken in a first plane (P1) perpendicular to the longitudinal axis of rotation (A1) and passing through the central recess (32):
an imaginary third circle (C3) coaxial with the longitudinal axis of rotation (A1) circumscribes the engagement member (62).

22. The rotary cutting tool (52) according to claim 21, wherein:
the imaginary third circle (C3) contacts the plurality of engagement surfaces (64).

23. The rotary cutting tool (52) according to claim 21, wherein:
the plurality of engagement surfaces (64) form a plurality of spaced apart engagement arcs (68) coincident with the imaginary third circle (C3).

24. The rotary cutting tool (52) according to claim 20, wherein:
the plurality of engagement surfaces (64) diverge from one another in the rearward direction (DR).

25. The rotary cutting tool (52) according to claim 17, wherein:
the base surface (60) makes contact with the support surface (30), or a plurality of shoulder surfaces (63) offset therefrom.

26. A method of assembling the rotary cutting tool (52) according to claim 17, in which the engagement member (62) has a plurality of radially outward facing engagement surfaces (64) circumferentially alternating with a plurality of joining surfaces (66), the method comprising the steps of:
orienting the base surface (60) to face the support surface (30);
aligning the head axis (A3) with the longitudinal axis of rotation (A1);
rotationally aligning the plurality of engagement surfaces (64) with the plurality of intermediate surfaces (44);
inserting the engagement member (62) into the central recess (32); and
rotating the cutting head (54) about its head axis (A3) until the plurality of engagement surfaces (64) are resiliently retained against the plurality of abutment surfaces (42).

27. The method according to claim 26, wherein:
in step d), the engagement member (62) is inserted into the central recess (32) until the base surface (60) makes contact with the support surface (30), or a plurality of shoulder surfaces (63) offset therefrom.

28. The method according to claim 27, wherein:
a plurality of drive members (34) protrude forwardly from the support surface (30), each drive member (34) including a drive surface (36) facing in a rotation direction (R) about the longitudinal axis of rotation (A1), the mounting portion (58) has a plurality of circumferentially spaced apart side surfaces (70) extending away from the base surface (60) towards the cutting portion (56), each side surface (70) including a torque transmission surface (72), and in step e), the cutting head (54) is rotated about its head axis (A3) in a direction opposite to the rotation direction (R) until each drive surface (36) makes contact with one of the torque transmission surfaces (72).

* * * * *